US012547780B2

(12) United States Patent
Cheng

(10) Patent No.: US 12,547,780 B2
(45) Date of Patent: Feb. 10, 2026

(54) COMMUNICATION APPARATUS, METHOD, SYSTEM, DEVICE, MEDIUM, ENCRYPTION SYSTEM, AND SERVER

(71) Applicant: Suzhou MetaBrain Intelligent Technology Co., Ltd., Suzhou (CN)

(72) Inventor: Peng Cheng, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/116,114

(22) PCT Filed: Apr. 15, 2024

(86) PCT No.: PCT/CN2024/087787
§ 371 (c)(1),
(2) Date: Mar. 27, 2025

(87) PCT Pub. No.: WO2025/091791
PCT Pub. Date: May 8, 2025

(65) Prior Publication Data
US 2025/0265375 A1    Aug. 21, 2025

(30) Foreign Application Priority Data
Oct. 31, 2023  (CN) .......................... 202311425518.5

(51) Int. Cl.
*G06F 21/72* (2013.01)
(52) U.S. Cl.
CPC .................................. *G06F 21/72* (2013.01)
(58) Field of Classification Search
CPC ..................................................... G06F 21/72
See application file for complete search history.

(56) References Cited

U.S. PATENT DOCUMENTS 9,064,135 B1 *  6/2015  Poo .......................... G06F 21/72
10,678,953 B1 *  6/2020  Allo ....................... H04L 9/0877
(Continued)

FOREIGN PATENT DOCUMENTS

| CN | 101794362 A | 8/2010 |
| CN | 201820230 U | 5/2011 |

(Continued)

OTHER PUBLICATIONS

International Search Report of corresponding PCT application (PCT/CN2024/087787) Jun. 22, 2024 including English translation (9 pages).

(Continued)

*Primary Examiner* — Theodore C Parsons
*Assistant Examiner* — Alan L Kong
(74) *Attorney, Agent, or Firm* — Crowell & Moring LLP

(57) ABSTRACT

The present application discloses a communication apparatus, a method, a system, a device, a medium, an encryption system, and a server. The communication apparatus includes: a platform trusted root connector disposed on a motherboard of a server and connected to a platform trusted root unit; a controller, wherein an input end is connected to the platform trusted root connector, and a plurality of output ends are connected to a plurality of functional units to be encrypted on the server in a one-to-one correspondence; and the controller is configured for determining a control instruction according to a preset encryption requirement and controlling the platform trusted root unit to communicate with one or more functional units to be encrypted according to the control instruction.

18 Claims, 5 Drawing Sheets

(56) References Cited

U.S. PATENT DOCUMENTS

| | | | | |
|---|---|---|---|---|
| 10,796,002 | B1* | 10/2020 | Raskin | G06F 21/85 |
| 11,288,226 | B1* | 3/2022 | Galles | G06F 13/4204 |
| 2008/0159541 | A1* | 7/2008 | Kumar | G06F 21/57 |
| | | | | 380/278 |
| 2015/0067352 | A1* | 3/2015 | Winslow | G09C 1/00 |
| | | | | 713/192 |
| 2017/0201373 | A1* | 7/2017 | Vijayakumar | G06F 11/1433 |
| 2020/0067987 | A1* | 2/2020 | Haid | G06F 21/57 |
| 2020/0082091 | A1* | 3/2020 | Areno | G06F 9/45558 |

FOREIGN PATENT DOCUMENTS

| | | |
|---|---|---|
| CN | 102122198 A | 7/2011 |
| CN | 103986837 A | 8/2014 |
| CN | 108334754 A | 7/2018 |
| CN | 215219687 U | 12/2021 |
| CN | 113987528 A | 1/2022 |
| CN | 219320770 U | 7/2023 |
| CN | 117155714 A | 12/2023 |
| WO | WO 2013100967 A1 | 7/2013 |

OTHER PUBLICATIONS

Written Opinion of International Searching Authority of corresponding PCT application (PCT/CN2024/087787) Jun. 22, 2024 including English translation (12 pages).
Search report of corresponding CN priority application (CN202311425518.5) Nov. 13, 2023 (3 pages).
First Office Action of corresponding CN priority application (CN202311425518.5) Dec. 4, 2023 including English translation (9 pages).
Notification to Grant Patent Right for Invention of corresponding CN priority application (CN202311425518.5) Jan. 4, 2024 including English translation, and including allowed claims and English translation of allowed claims in corresponding CN priority application CN202311425518.5 (15 pages).

* cited by examiner

COMMUNICATION APPARATUS, METHOD, SYSTEM, DEVICE, MEDIUM, ENCRYPTION SYSTEM, AND SERVER

CROSS-REFERENCE TO RELATED APPLICATION

This application is the national phase application of International Application No. PCT/CN2024/087787, filed Apr. 15 2024, which claims the priority of the Chinese patent application filed on Oct. 31, 2023 before the CNIPA, China National Intellectual Property Administration with the application number of 202311425518.5 and the title of "Communication Apparatus, Method, System, Device, Medium. The contents of International Application No. PCT/CN2024/087787 and Chinese Patent Application No. 202311425518.5 are incorporated herein by reference in their entireties.

FIELD

The present application relates to a communication apparatus, a method, a system, a device, a medium, an encryption system, and a server.

BACKGROUND

With the rapid advancement of Internet technology, servers, as the core components for information data processing and transmission, have become critically important in terms of security and stability. Particularly in this data-driven era, the encryption and transmission security of information data have garnered extensive attention. To address this requirement, numerous Internet service providers are continuously expanding the deployment of servers to facilitate additional service provisioning. However, a concomitant issue arises in that the information data within the server necessitates transmission over the network, wherein certain information is sensitive and requires encryption protection, while other information is publicly accessible. This imposes more stringent requirements on the security design of the server to prevent attacks from ransomware or unidentified hackers, thereby avoiding server paralysis.

Therefore, a Platform Root of Trust (PROT) unit is typically designed to encrypt each functional unit on the motherboard by connection with the PROT connector installed on the motherboard. Although this method achieves the encryption protection of the server to a certain extent, with the continuous increase in server functionalities, the quantity of functional units installed on the motherboard also continues to grow. This implies that multiple PROT connectors must be installed on the motherboard to connect with multiple PROT units, thereby inevitably augmenting the hardware complexity and spatial demands of the server. Particularly within a confined space, such a design may result in a series of issues, such as server heat dissipation and electromagnetic compatibility, etc.

Therefore, how to support the connection of more PROT units within a confined server space or a restricted motherboard layout space has become an urgent issue to be addressed by a person skilled in the art.

SUMMARY

According to an embodiment of the present application, in a first aspect, there is provided a communication apparatus, including: a platform trusted root connector disposed on a motherboard of a server and connected to a platform trusted root unit; a controller, wherein an input end is connected to the platform trusted root connector, and a plurality of output ends are connected to a plurality of functional units to be encrypted on the server in a one-to-one correspondence; and the controller is configured for determining a control instruction according to a preset encryption requirement and controlling the platform trusted root unit to communicate with one or more functional units to be encrypted according to the control instruction.

According to an embodiment of the present application, in a second aspect, there is provided a communication method applied to the aforementioned communication apparatus, including: obtaining the preset encryption requirement, and determining the control instruction according to the preset encryption requirement; controlling the platform trusted root unit to communicate with one or more functional units to be encrypted according to the control instruction; and triggering the platform trusted root unit to encrypt data of the functional unit(s) to be encrypted.

According to an embodiment of the present application, in a third aspect, the present application further provides a communication system applied to the communication apparatus according to the first aspect described above, including: an acquisition unit configured for obtaining the preset encryption requirement, and determining the control instruction according to the preset encryption requirement; a channel control unit configured for controlling the platform trusted root unit to communicate with one or more functional units to be encrypted according to the control instruction; and an encryption unit configured for triggering the platform trusted root unit to encrypt data of a target encryption functional unit to be encrypted.

According to an embodiment of the present application, in a fourth aspect, the present application further provides an electronic device, including a memory configured for storing a computer program; and a controller configured for implementing steps of the communication method according to the second aspect described above when executing the computer program.

According to an embodiment of the present application, in a fifth aspect, the present application further provides a non-transitory computer-readable storage medium, wherein the non-transitory computer-readable storage medium has stored thereon a computer program which, when executed by a controller, implements steps of the communication method according to the second aspect described above.

According to an embodiment of the present application, in a sixth aspect, the present application further provides an encryption system, including a platform trusted root connector, a platform trusted root unit, a controller, and several functional units to be encrypted, wherein the functional units to be encrypted at least include a baseboard management controller, a central processing unit, and a USB integrated circuit; and the controller controls the platform trusted root unit to encrypt data of one or more functional units to be encrypted through the platform trusted root connector.

According to an embodiment of the present application, in a seventh aspect, the present application further provides a server including the encryption system according to the sixth aspect described above.

The details of one or more embodiments of the present application are set forth in the accompanying drawings and the description below. Other features and advantages of the present application will become apparent from the description, the drawings, and the claims.

BRIEF DESCRIPTION OF THE DRAWINGS

In order to explain the technical solutions in some embodiments of the present application more clearly, the following contents will briefly introduce the drawings which need to be used in the prior art or embodiments. It should be apparent that the drawings in the following description are some embodiments of the present application, and it would be possible for a person skilled in the art to obtain other drawings according to these drawings without involving any inventive effort.

DETAILED DESCRIPTION

The essence of the present application is to provide a communication apparatus, a method, a system, a device, a medium, an encryption system, and a server, wherein a single platform trusted root connector is utilized to connect with a platform trusted root unit, and a controller manages a switching of a communication channel between the platform trusted root connector and a plurality of functional units to be encrypted. This configuration enables the encryption protection of the plurality of functional units to be encrypted within a confined space, while circumventing the heat dissipation and electromagnetic compatibility issues associated with deploying a plurality of platform trusted root connectors.

In order that the objects, technical solutions, and advantages of the embodiments of the present application will become more distinct, the technical solutions of the embodiments of the present application will now be described more clearly and fully hereinafter in combination with the accompanying drawings, in which embodiments of the present application are shown. Obviously, it is to be understood that the embodiments described are a few, but not all embodiments of the present disclosure. According to the embodiments of the present application, all other embodiments obtained by a person skilled in the art without inventive effort fall within the scope of protection of the present application.

Figure 1:
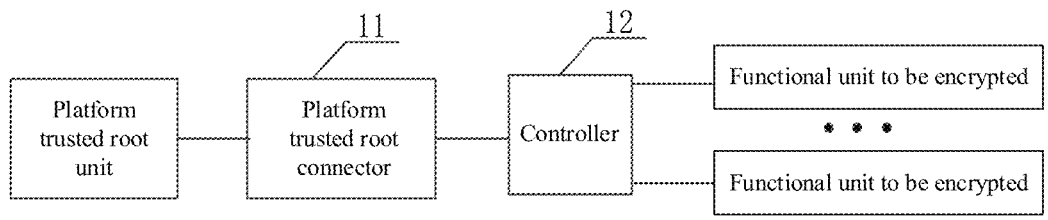
FIG. 1 is a schematic structural diagram of a communication apparatus according to one or more embodiments of the present application.

The present application provides a communication apparatus, as illustrated in FIG. 1, including:

a platform trusted root connector 11 disposed on a motherboard of a server and connected to a platform trusted root unit;

a controller 12, wherein an input end is connected to the platform trusted root connector 11, and a plurality of output ends are connected to a plurality of functional units to be encrypted on the server in a one-to-one correspondence; and the controller 12 is configured for determining a control instruction according to a preset encryption requirement and controlling the platform trusted root unit to communicate with one or more functional units to be encrypted according to the control instruction.

This embodiment describes a communication apparatus designed to minimize the quantity of connectors required for connecting multiple PROT units on the motherboard of the server, thereby reducing hardware complexity and spatial requirements.

In some embodiments, the platform trusted root connector 11 is disposed on the motherboard of the server and is configured to be connected to the platform trusted root unit. The platform trusted root unit is one hardware unit capable of providing secure encryption and authentication functionalities. The controller 12 is connected to an input end of the platform trusted root connector 11 and is also connected to the plurality of functional units to be encrypted on the server. The controller 12 has a plurality of output ends, each of which is connected to one functional unit to be encrypted in a one-to-one correspondence.

The controller 12 has the functionality of determining a control instruction according to a preset encryption requirement and controlling the platform trusted root unit to communicate with one or more functional units to be encrypted according to the control instruction. In some embodiments, a target encryption functional unit (target encryption functional assembly) may be determined according to the control instruction. The encryption requirements may vary according to the specific demands of the server, wherein certain units may necessitate encryption implementation, whereas other units may remain unencrypted. This implies that distinct encryption strategies or conditions might be established to designate particular functional units requiring encryption protection. Then, the method for controlling the platform trusted root unit to communicate with the target encryption functional unit may in some embodiments be controlling a channel between an input end of the controller itself (controller 12) and a corresponding output end of the target encryption functional unit on conduction. This means that when the controller 12 determines that communication with a specific functional unit is required, it will open a corresponding channel to enable the platform trusted root unit to communicate with the target encryption functional unit.

The concept of the present embodiment is to implement encryption protection for multiple functional units on the server by integrating one platform trusted root connector 11 and a controller 12 unit. In contrast to conventional designs, the communication apparatus simplifies the requirement for connecting multiple PROT units into one single platform trusted root connector 11. Through the configuration of the controller 12, cryptographic protection for various functional units might be implemented, and communication with the target encryption functional unit might be established when necessary.

This design mitigates the hardware complexity and spatial demands of the server to a certain degree, and alleviates the heat dissipation and electromagnetic compatibility issues arising from the interconnection of multiple PROT units. At the same time, by presetting the encryption requirements and configuring the controller 12, the communication apparatus might flexibly adapt to the encryption protection requirements of various servers.

In some embodiments, the platform trusted root unit includes a plurality of types of sub-units (sub-hardware units), and the controller 12 is configured for determining the control instruction according to a type of the sub-unit connected to the platform trusted root connector 11, and controlling the platform trusted root unit to communicate with one or more functional units to be encrypted according to the control instruction.

This embodiment provides a more detailed description of the composition of the platform trusted root unit and the functionality of the controller 12. In some embodiments, the platform trusted root unit may be composed of multiple types of sub-units. These sub-units may possess distinct functionalities, such as authentication, encryption algorithms, and the like. The controller 12 is in some embodiments configured to determine the control instruction according to the type of the sub-unit connected to the platform trusted root connector 11, to determine the target encryption functional unit according to the control instruction, and to control the channel between the input end thereof and a corresponding output end of the target encryption functional unit on conduction. Thus, communication between the sub-unit connected to the platform trusted root connector and the target encryption functional unit might be implemented.

In summary, the present embodiment elaborates on the composition of the platform trusted root unit and the function of the controller 12. Through the functionality of the controller 12, the target encryption functional unit is determined according to different types of the sub-units, and the channel is established to facilitate communication with the platform trusted root unit. This communication apparatus might be flexibly applied to different types of platform trusted root units and achieve secure communication functionalities.

In some embodiments, the platform trusted root connector 11 includes a predefined unit type identification pin and a communication pin, and the predefined unit type identification pin and the communication pin of the platform trusted root connector 11 are both connected with the controller 12;

The controller 12 is in some embodiments configured to determine the type of the sub-unit connected to the platform trusted root connector 11 according to a state of the predefined unit type identification pin, thereby determining the control instruction, subsequently determining the target encryption functional unit, and controlling the channel between an input end of the controller 12 connected to the communication pin and a corresponding output end of the target encryption functional unit on conduction, so as to implement communication between the sub-unit connected to the platform trusted root connector and the target encryption functional unit.

The specific composition and function of the aforementioned platform trusted root connector 11 are described in this embodiment. In this embodiment, the platform trusted root connector 11 includes two parts: a predefined unit type identification pin (SMB_CPLD) and communication pins (FLEXIO1 and FLEXIO2 in FIG. 2). The two pins are connected with the controller 12.

The predefined unit type identification pin is configured to determine the type of the sub-unit connected to the platform trusted root connector 11. By reading the states of these pins, the controller 12 might determine the type of the sub-unit being connected. The communication pins are configured to realize communication between the platform trusted root connector 11 and the target encryption functional unit. The controller 12 establishes the channel between the input end connected to the communication pin and the output end corresponding to the target encryption functional unit, thereby enabling communication between the sub-unit connected to the platform trusted root connector and the target encryption functional unit.

In summary, the present embodiment in some embodiments describes the composition and functionality of the platform trusted root connector 11, as well as the manner by which the controller 12 identifies the type of the sub-unit and realizes communication via the predefined unit type identification pin and the communication pin. The communication apparatus designed in this manner enables communication with the target encryption functional unit according to different types of sub-units, while providing flexibility and scalability.

In some embodiments, the controller 12 multiplexes a complex programmable logic device provided on the motherboard.

In this embodiment, the controller 12 might implement its functions by utilizing the complex programmable logic device already present on the motherboard, thereby eliminating the need for additional hardware assemblies.

The programmable logic device is an electronic means capable of being reconfigured in accordance with user requirements. This implies that it might achieve a variety of functions by altering the connection manner and functionality of its internal circuitry.

In this embodiment, the controller 12 may multiplex such programmable logic device on the motherboard to achieve control and communication of the target encryption functional unit. Through programming configuration, the controller 12 is capable of determining the target encryption functional unit according to the preset encryption requirement and establishing the conduction of the channel between the input end of the controller 12 and the corresponding output end of the target encryption functional unit by controlling the connection of the programmable logic device. Thus, the communication between the platform trusted root unit and the target encryption functional unit might be effectively achieved.

By multiplexing the programmable logic device, the hardware cost and complexity might be reduced, while the flexibility and scalability of the system might be enhanced. Simultaneously, this also contributes to the reduction of design and development time and enhances production efficiency.

Figure 4:
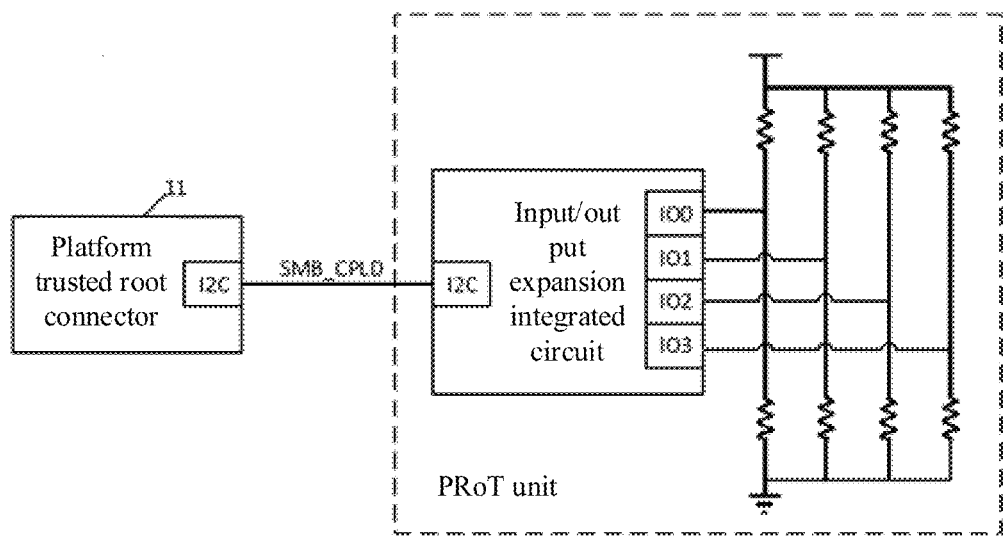
FIG. 4 is a schematic diagram of an input/output expansion integrated circuit according to one or more embodiments of the present application.

As shown in FIG. 4, in some embodiments, the platform trusted root unit further includes an input/output expansion integrated circuit, an input end of the input/output expansion integrated circuit is connected to the platform trusted root connector 11, a plurality of output ends of the input/output expansion integrated circuit are in a one-to-one correspondence to the plurality of types of sub-units, each of the output ends of the input/output expansion integrated circuit is provided with a pull-up resistor and/or a pull-down resistor, and when the sub-unit is connected to the output end, a level state of the output end connected with the sub-unit is a preset state.

In such an embodiment, the platform trusted root unit includes the input/output expansion integrated circuit. The input end of the input/output expansion integrated circuit is connected to the platform trusted root connector 11, and the output ends are in a one-to-one correspondence to the plurality of different types of sub-units. Each output end is provided with the pull-up resistor and/or the pull-down resistor, and when the sub-unit is connected to the output end, the level state of the output end is a preset state.

The controller 12 is configured to determine the target encryption functional unit according to the type of the sub-unit connected to the platform trusted root connector 11, and to control the channel between the input end of the controller 12 and the corresponding output end of the target encryption functional unit on conduction, thereby enabling communication between the platform trusted root unit and the target encryption functional unit.

In other words, when a specific type of sub-unit is connected to the platform trusted root connector 11, the controller 12 identifies the type of sub-unit and determines the corresponding target encryption functional unit. The controller 12 then opens a channel corresponding to the target encryption functional unit, enabling the platform trusted root unit to communicate with the target encryption functional unit.

In FIG. 4, one input/output expansion integrated circuit (an I2C-to-IO conversion chip, typically employing chips such as PCA9554/PCA9555/CA9554 etc.) is utilized to extend four IOs, with different sub-units being differentiated by external pull-up and pull-down resistors.

This embodiment achieves the identification of various types of sub-units and the control of the conduction of the channel by utilizing the input/output expansion integrated circuit and configuring a preset level state. Such a design might flexibly adapt to various types of encryption functional units and ensure effective communication with the platform trusted root unit.

Figure 5:
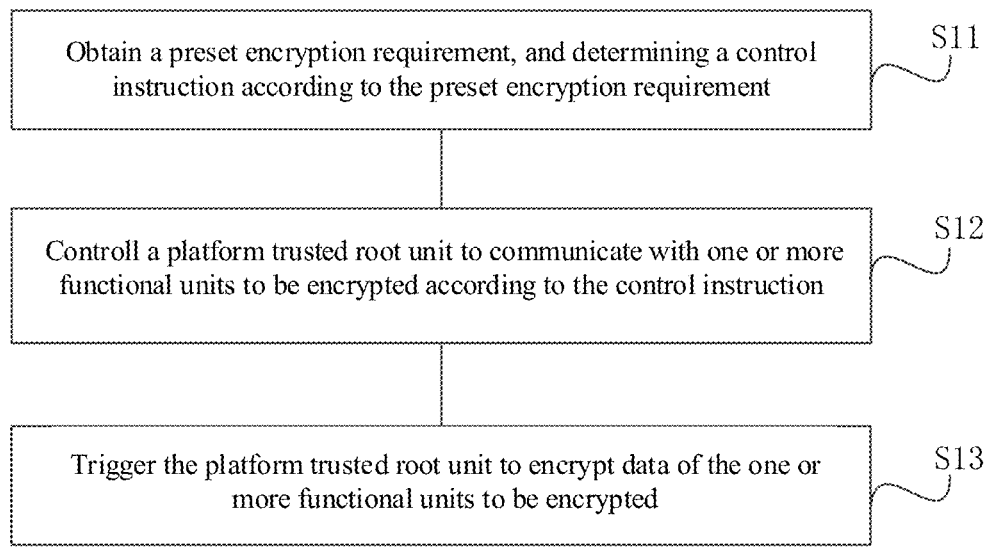
FIG. 5 is a schematic diagram of a communication method according to one or more embodiments of the present application.

To address the aforementioned technical problem, the present application further provides a communication method, as illustrated in FIG. 5, which is applied to the aforementioned communication apparatus and includes that:

S11: the preset encryption requirement is obtained, and the control instruction is determined according to the preset encryption requirement;

first, an initial step of the method is to obtain the preset encryption requirement. This implies that one mechanism must be established within the communication apparatus to obtain the preset encryption requirement, which may be input by a user or automatically designated by another program or system. The preset encryption requirements may include a specific encryption algorithm, a key length, or other encryption parameters.

S12: the platform trusted root unit is controlled to communicate with one or more functional units to be encrypted according to the control instruction;

next, according to the preset encryption requirement, the control instruction is determined, thereby enabling the determination of the target encryption functional unit that requires encryption. In the communication apparatus, there may be multiple functional units to be encrypted available, and according to the preset requirement, it is necessary to determine the target encryption functional unit, which is the unit to undergo encryption processing.

Then, the channel between the input end of the controller 12 and the corresponding output end of the target encryption functional unit is controlled on conduction. This implies that a mechanism or interface is required in the communication apparatus to connect the input end of the controller 12 to the output of the target encryption functional unit, thereby establishing a channel for data transmission. This facilitates the data flow from the controller 12 to the target encryption functional unit.

S13: The platform trusted root unit is triggered to encrypt data of the one or more functional units to be encrypted.

Finally, the platform trusted root unit is triggered to encrypt the data of one or more functional units to be encrypted (i.e., the target encryption functional unit described in the above-mentioned embodiment). Once the channel is conducted, the controller 12 triggers the platform trusted root unit to encrypt the data of the target encryption functional unit in certain manner. This may involve invoking an encryption algorithm and utilizing a corresponding key to ensure that the target encryption functional unit correctly encrypts the data, thereby achieving secure communication.

In summary, the present embodiment describes a communication method for determining the target encryption functional unit according to the preset encryption requirement, and triggering the platform trusted root unit to encrypt data of the target encryption functional unit by controlling the controller 12 and enabling channel conduction. This method may ensure that the communication apparatus might protect and securely transmit data according to specific encryption requirements and functional selections during the communication process.

In one embodiment, the obtaining a preset encryption requirement includes:

obtaining a state of a pin, connected with the controller 12, of the platform trusted root connector 11;

determining the preset encryption requirement according to the state of the pin.

The present embodiment provides a detailed description of a method for obtaining the preset encryption requirement. In an embodiment, the obtaining the preset encryption requirement includes the following steps: first, detecting the state of the pin, connected with the controller 12, of the platform trusted root connector 11. By detecting the state of the pin, information regarding the platform trusted root connector might be obtained. Secondly, the preset encryption requirement is determined according to the state of the pin. This means that according to the state of the pin, the specific requirements of the desired encryption function, such as the encryption algorithm, the key length, and the like, might be determined. This method for determining the preset encryption requirement by detecting the pin state ensures that the encryption function is configured according to actual needs and environmental conditions, thereby enhancing the flexibility and customizability of the system.

In some embodiments, before obtaining a state of a pin, connected with the controller 12, of the platform trusted root connector 11, the method further includes:

the determining whether the platform trusted root unit is connected to the platform trusted root connector 11;

if connected, proceeding to the step of obtaining a state of a pin, connected with the controller 12, of the platform trusted root connector 11.

This embodiment describes the step for obtaining preset encryption requirements in one embodiment. In this embodiment, it is first necessary to determine whether the platform trusted root unit is connected to the platform trusted root connector 11. If a connection is present, the operation of obtaining the preset encryption requirement may be further performed.

A connection state thereof might be known by obtaining the state of the pin, connected with the controller 12, of the platform trusted root connector 11. The preset encryption requirement might be determined according to the state of the pin. The states of these pins may include information such as a control signal or the unit type of the connected sub-unit, and the relevant preset encryption requirement might be judged by analyzing these information.

Accordingly, the present embodiment provides a method for obtaining the preset encryption requirement, which involves determining a connection state between the platform trusted root unit and a platform trusted root connector 11, and obtaining the preset encryption requirement according to the connection state by obtaining the state of the pin, connected with the controller 12, of the platform trusted root connector 11.

In some embodiments, the method further includes:
predefining a first pin, connected with the controller 12, of the platform trusted root connector 11 as an in-position judgment pin;
the determining whether the platform trusted root unit is connected to the platform trusted root connector 11 includes:
determining whether the platform trusted root unit is connected to the platform trusted root connector 11 according to a pin state of the in-position judgment pin.

This embodiment describes an additional step for determining whether the platform trusted root unit is connected to the platform trusted root connector 11. The purpose of this step is to ensure obtaining a state of a pin, connected with the controller 12, of the platform trusted root connector 11 correctly.

In this embodiment, firstly a first pin, connected with the controller 12, of the platform trusted root connector 11 is predefined as the in-position judgment pin. Whether the platform trusted root unit is connected to the platform trusted root connector 11 might be determined according to a state of the in-position judgment pin.

Therefore, in the first step, the pin state is detected for determining whether the platform trusted root unit is connected to the platform trusted root connector 11. This might be achieved by reading the pin state of the in-position judgment pin. If the pin state of the in-position judgment pin indicates that the platform trusted root unit is connected to the platform trusted root connector 11, the process may proceed to the step of obtaining the state of the pin, connected with the controller 12, of the platform trusted root connector 11. If the pin state of the in-position judgment pin indicates that the platform trusted root unit is not connected to the platform trusted root connector 11, the execution of this communication method may be terminated or appropriate processing measures may be taken.

In some embodiments, the determining whether the platform trusted root unit is connected to the platform trusted root connector 11 according to a pin state of the in-position judgment pin includes:
determining whether the platform trusted root unit is connected to the platform trusted root connector 11 according to a level state of the in-position judgment pin.

The present embodiment indicates determining whether the platform trusted root unit is connected to the platform trusted root connector 11 according to a pin state of the in-position judgment pin. In some embodiments, by monitoring the level state of the in-position judgment pin, it might be determined whether the platform trusted root unit has been successfully connected to the platform trusted root connector 11.

The in-position judgment pin is typically a specific set of pins used to indicate whether an assembly or unit has been inserted or connected. These pins generally have two states, such as a high level and a low level. When the platform trusted root unit is successfully connected to the platform trusted root connector 11, the level states of these pins will change.

By monitoring the level state of the in-position judgment pin, it might be determined whether the platform trusted root unit is connected to the platform trusted root connector 11. If the level state of the in-position judgment pin matches a predefined connection state, that is, the connection condition is satisfied, it might be confirmed that the platform trusted root unit has been connected to the platform trusted root connector 11.

The purpose of this step is to ensure the normal connection between the platform trusted root unit and the controller 12, as in subsequent operations, the platform trusted root unit will encrypt the data of the target encryption functional unit, which necessitates effective communication between the platform trusted root unit and the controller 12. Therefore, by detecting the level state of the in-position judgment pin, it might be determined whether the platform trusted root unit is correctly connected, thereby ensuring the accuracy and reliability of subsequent encryption processing operations.

In some embodiments, the platform trusted root unit includes a plurality of types of sub-units and the method further includes:
predefining a second pin, connected with the controller 12, of the platform trusted root connector 11 as a unit type identification pin; and
the determining the preset encryption requirement according to the state of the pin includes:
determining the type of the sub-unit connected to the platform trusted root connector 11 according to a state of the unit type identification pin; and
determining the preset encryption requirement according to a determined type of the sub-unit.

The present embodiment describes the structure and function of the platform trusted root unit. The platform trusted root unit includes a plurality of types of sub-units and further includes one pin for unit type identification. The type of the sub-unit connected to the platform trusted root connector 11 might be determined according to the state of the pin, thereby determining the preset encryption requirement.

In this embodiment, the platform trusted root unit is configured to provide security and encryption functionalities. It includes a plurality of sub-units, each of which may possess distinct encryption functionalities or capabilities. To determine which sub-unit is actually utilized, the pin is designated as the unit type identification pin.

By reading the state of the unit type identification pin, the type of the sub-unit connected to the platform trusted root connector 11 might be determined. According to the identified type of the sub-unit, the preset encryption requirement might be determined. This implies that distinct types of sub-units may necessitate varying encryption functionalities. Consequently, determining the preset encryption requirement according to the type of the sub-unit ensures the utilization of the appropriate encryption functional unit.

In some embodiments, the determining the type of the sub-unit connected to the platform trusted root connector 11 according to a state of the unit type identification pin includes:

determining the type of the sub-unit connected to the platform trusted root connector 11 according to a level state of the unit type identification pin.

This embodiment determines the type of the sub-unit connected to the platform trusted root connector 11 according to a state of the unit type identification pin.

In this embodiment, the platform trusted root unit includes a plurality of types of sub-units, and the second pin, connected with the controller 12, of the platform trusted root connector 11 is predefined as the unit type identification pin.

By detecting the level state of the unit type identification pin, the type of the sub-unit connected to the platform trusted root connector 11 might be determined. The sub-units might be categorized into various types according to different level states.

This method for determining the type of the sub-unit enables the system to select an appropriate preset encryption function according to varying requirements. For example, if the sub-unit is determined to be of type A, the system may be configured and operated accordingly according to the preset encryption requirement of type A.

This method provides an effective manner to determine the preset encryption requirement according to different unit types, thereby achieving a more flexible and intelligent communication system.

In some embodiments, the determining the type of the sub-unit connected to the platform trusted root connector 11 according to a level state of the unit type identification pin includes:

determining an identify label of the sub-unit connected to the platform trusted root connector 11 according to a level state of the unit type identification pin; and determining the type of the sub-unit connected to the platform trusted root connector 11 according to a determined identify label.

The present embodiment relates to determining the type of the sub-unit connected to the platform trusted root connector 11 according to the level state of the unit type identification pin. In some embodiments, such an embodiment determines the identify label of the sub-unit connected to the platform trusted root connector 11 by detecting the level state of the unit type identification pin, and subsequently determines the type of the sub-unit according to the identified identify label.

In this embodiment, the platform trusted root unit includes a plurality of types of sub-units, and the second pin, connected with the controller 12, of the platform trusted root connector 11 is predefined as the unit type identification pin. When the communication apparatus is in operation, the level state of the pin will change. According to the change in the level state, the identify label of the sub-unit connected to the platform trusted root connector 11 might be inferred.

Once the identify label of the sub-unit is determined, the specific type of the sub-unit might be identified according to this identify label. This type of determination facilitates the determination of a preset encryption requirement for the target encryption functional unit in communication with the communication apparatus.

The present embodiment enables the determination of the type of the sub-unit connected to the platform trusted root connector 11 according to the level state of the unit type identification pin in the communication apparatus, and accordingly determines the preset encryption requirement of the target encryption functional unit for communication with the communication apparatus. Such an implementation facilitates enhanced fulfillment of specific encryption requirements and improves the security and reliability of the communication apparatus.

In some embodiments, the method further includes:

pre-establishing a correspondence between the level state of the unit type identification pin and the identify label of each sub-unit; and the determining an identify label of the sub-unit connected to the platform trusted root connector 11 according to the level state of the unit type identification pin includes:

determining the identify label of the sub-unit connected to the platform trusted root connector 11 according to the level state of the unit type identification pin and the correspondence.

In an embodiment, a correspondence between the level state of the unit type identification pin and the identify label of each sub-unit is pre-established. According to this correspondence, the identify label of the sub-unit connected to the platform trusted root connector 11 might be determined.

The objective of this embodiment is to more accurately determine the preset encryption requirement, thereby realizing the customization of the encryption functionality of the communication apparatus. In an embodiment, the platform trusted root unit includes a plurality of types of sub-units, and the second pin, connected with the controller 12, of the platform trusted root connector 11 is predefined as the unit type identification pin.

According to the description of this embodiment, a correspondence between the level state of the unit type identification pin and the identify label of each sub-unit is pre-established. This means that for each type of sub-unit, the type thereof might be determined according to the level state corresponding to the identify label thereof.

In practical applications, the level state of the unit type identification pin may have various possibilities, such as a high level and a low level respectively indicating different types of sub-units. According to the pre-established correspondence, the identify label of the sub-unit connected to the platform trusted root connector 11 might be determined according to the level state of the unit type identification pin.

As shown in Table 1, Table 1 illustrates the correspondence between the level state of the unit type identification pin and the identify label of each sub-unit.

TABLE 1

| Type | IO4 | IO3 | IO2 | IO1 |
|---|---|---|---|---|
| PFR + TPM unit | 0 | 0 | 0 | 0 |
| USB unit unit | 0 | 0 | 0 | 1 |
| UART unit | 0 | 0 | 1 | 0 |
| LED unit | 0 | 1 | 0 | 0 |
| Other units | . . . | . . . | . . . | . . . |

In summary, the present embodiment might determine the identify label of the sub-unit connected to the platform trusted root connector 11 according to the level state of the unit type identification pin by pre-establishing the correspondence between the level state of the unit type identification pin and the identify label of each sub-unit. This facilitates the precise definition of the preset encryption requirement, thereby enabling the customization of encryption functionality for the communication apparatus.

In some embodiments, the method further includes:

predefining a third pin and a fourth pin of the platform trusted root connector 11 as two communication pins; and the controlling the platform trusted root unit to communicate with one or more functional units to be encrypted according to the control instruction includes:

determining a target encryption functional unit according to the control instruction, and controlling two data transmission pins corresponding to the target encryption functional unit in the controller 12 to be connected with the two communication pins of the platform trusted root connector 11 in a one-to-one correspondence.

In the present embodiment, the pin configuration of the platform trusted root connector 11 is further defined. The third pin and the fourth pin are designated as two communication pins. According to this configuration, the two data transmission pins in the controller 12 are connected to the communication pins of the target encryption functional unit in a one-to-one correspondence. After the target encryption functional unit is determined, only the data transmission pins, correspondingly connected to the target encryption functional unit, in the controller 12 need to be controlled to be correspondingly connected with the communication pins on the platform trusted root connector 11, thereby realizing the connection between the platform trusted root connector 11 and the target encryption functional unit. Consequently, the platform trusted root unit might autonomously communicate with the target encryption functional unit and effectively perform encryption processing. Such a configuration might satisfy the encryption function requirements of the communication apparatus and provide a secure encryption communication environment.

In some embodiments, the controlling the platform trusted root unit to communicate with one or more functional units to be encrypted according to the control instruction includes:

the controller 12 controlling a channel between an input end of the controller and output ends corresponding to one or more functional units to be encrypted on conduction in a transparent transmission or conversion manner according to the control instruction, thereby enabling the platform trusted root unit to communicate with the one or more functional units to be encrypted.

The present embodiment describes a method for controlling the channel between the input end of the controller 12 and the output end of the functional unit to be encrypted requires encryption on conduction in the communication apparatus. The method may be implemented by means of a transparent transmission or conversion manner.

The transparent transmission manner refers to the controller 12 directly delivering the data received at the input end to the output end of the target encryption functional unit, thereby achieving lossless data transmission. This manner is analogous to data pass-through, wherein the controller 12 neither processes nor modifies the data.

Another manner is the conversion manner, which means that the controller 12 processes or modifies the received data prior to delivering same to the output end of the target encryption functional unit. This may involve the conversion of data formats or protocols to ensure that the data might be correctly processed by the target encryption functional unit.

Through the aforementioned method, the controller 12 might effectively connect the input end of the controller to the corresponding output end of the functional unit to be encrypted, thereby enabling communication between the platform trusted root unit and one or more functional units to be encrypted, and ensuring that the data might be processed and encrypted in accordance with the preset encryption requirement.

In some embodiments, after the controlling the platform trusted root unit to communicate with one or more functional units to be encrypted according to the control instruction, the method further includes:

triggering a logging operation, wherein the log includes at least a current time and an identifier of a currently conducting channel.

In this embodiment, the logging operation is initiated subsequent to the conduction of the channel. In specific embodiments, the logging operation at least includes the current time and the identifier of the current conducting channel.

The logging operation is a method for recording an operational state of a system. In the present technical solution, when the channel between the input end of the controller 12 and the corresponding output end of the target encryption functional unit is controlled on conduction, the system automatically triggers the logging operation. The recorded content includes two primary elements: the current time and the identifier of the currently conducting channel.

The current time denotes a timestamp of the logging, which is utilized to mark a specific time point for subsequent tracking and analysis. The current time may be obtained using an existing system clock or other time synchronization mechanism and recorded in the log in a specific format.

The identifier of the currently conducting channel is used to identify the channel that in some embodiments triggers the logging operation. The identifier of the channel may be a unique number, name, or other specific identifier to ensure that each channel has a distinct label. By utilizing the identifier of the channel, the operation state of each conducting channel might be precisely located and tracked in subsequent analyses.

This logging operation might assist system administrators and developers in understanding the operational state of the system, including the time point at which the channel is conducting and the specific conducting channel. By logging, the system might be better managed and maintained, potential issues might be promptly identified and resolved, and the reliability and security of the system might be enhanced.

In some embodiments, after the controlling the platform trusted root unit to communicate with one or more functional units to be encrypted according to the control instruction, the method further includes:

verifying whether the currently conducting channel might transmit data normally;

if so, proceeding to the step of triggering the platform trusted root unit to encrypt data of the one or more functional units to be encrypted; otherwise, outputting exception information.

In this embodiment, a further operation is described after the channel between the input end of the controller 12 and the corresponding output end of the one or more functional units to be encrypted is controlled on conduction. In some embodiments, after the channel is conducted, the controller 12 will verify the channel. The objective of this verification is to ensure that the channel works correctly and that data might be transmitted successfully. If the verification result indicates that the channel is capable of transmitting data normally, the system will proceed to the next step, which involves triggering the platform trusted root unit to encrypt the data of the functional unit to be encrypted requires encryption. This indicates that the system has verified the reliability of the channel and has commenced processing the data of the functional unit to be encrypted that requires encryption. If the verification result indicates that the channel is unable to transmit data properly, the system will output exception information. This exception information may indicate a failure or other issue with the current channel, preventing the encryption process from continuing. By outputting the exception information, the user or technician might be prompted to perform troubleshooting or repair.

In summary, the present embodiment describes further operations after the channel is conducted, including verifying whether the channel might transmit data normally, performing encryption processing, and outputting exception information in the event of an anomaly. These steps might ensure the reliability and security of the system during the data encryption process.

In some embodiments, the method is in some embodiments applied to the controller 12 in the communication apparatus, wherein a platform trusted root unit is triggered to encrypt the data of the functional unit to be encrypted that requires encryption, including:
  receiving data to be encrypted generated by the functional unit to be encrypted that requires encryption;
  transmitting the data to be encrypted to the platform trusted root connector 11 through a channel conducted by itself, whereby the platform trusted root unit obtains the data to be encrypted;
  triggering the platform trusted root unit to encrypt the data to be encrypted;
  obtaining encrypted data transmitted by the platform trusted root unit through the platform trusted root connector 11;
  transmitting the encrypted data to the functional unit to be encrypted that requires encryption.

The present embodiment describes the function of the controller 12 in the communication apparatus. The controller 12 employs a communication method to encrypt data of the functional unit to be encrypted that requires encryption.

First, the method includes receiving data to be encrypted generated by the functional unit to be encrypted that requires encryption. These data may include sensitive information requiring encryption. Next, the method transmits the data to be encrypted to the platform trusted root connector 11 through a channel conducted by itself. The platform trusted root connector 11 is an interface connected to the platform trusted root unit for data transmission. Upon transmission of the data to be encrypted to the platform trusted root connector 11, the method triggers the platform trusted root unit to encrypt the data to be encrypted. The platform trusted root unit is a unit with a highest trust level which is responsible for securely encrypting the data. Upon completion of the encryption, the platform trusted root unit transmits the encrypted data back via the platform trusted root connector 11. The method then transmits the encrypted data to the functional unit to be encrypted that requires encryption.

In general, the present embodiment describes an encryption processing procedure implemented by the controller 12. The controller 12 maintains a connection with the platform trusted root unit during data transmission and triggers it to encrypt the data. This might enhance the security of the communication apparatus, ensuring that sensitive information is protected during transmission.

Figure 2:
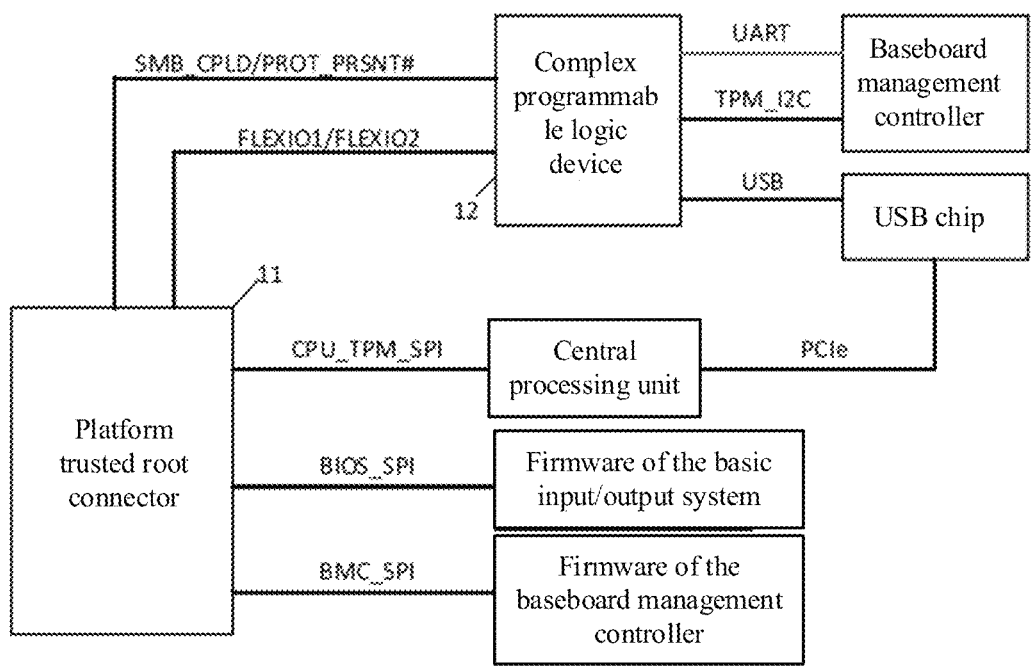
FIG. 2 is a detailed schematic diagram of a communication apparatus according to one or more embodiments of the present application.
Figure 3:
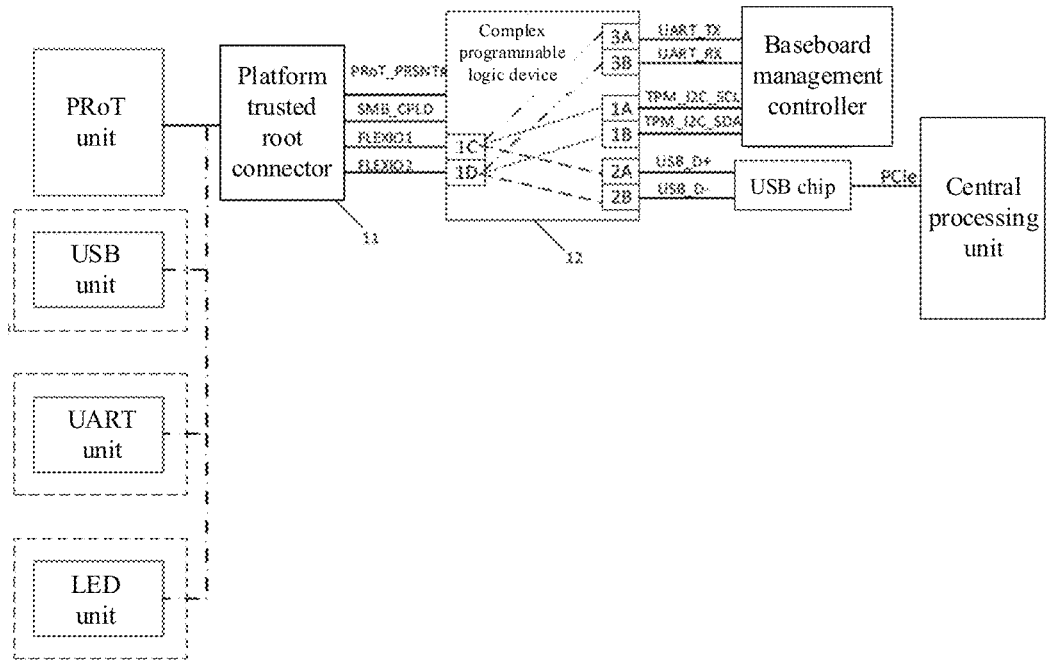
FIG. 3 is a detailed schematic diagram of a communication apparatus according to another one or more embodiments of the present application.

In one specific embodiment, as illustrated in FIGS. 2 and 3, the platform trusted root connector 11 typically multiplexes a connector of an M.2 M-Key form. This connector is a mature and widely adopted industry-standard connector with relatively low cost. Baseboard management controller: a management and control center commonly utilized in the server for administering network information and data. USB (universal serial bus) chip: a chip commonly used for the server transferred from PCIe (peripheral component interconnect express) to USB integrated circuit. In the present embodiment, it refers to a PCIe-to-USB 2.0 chip, which outputs USB D+/D− signals. The implementation process of the present embodiment is briefly described as follows:
  the conventionally designed platform trusted root connector 11 on the motherboard might only support PFR (platform firmware resilience) and Basic Input Output System trusted platform (BIOS TPM) units. In the present embodiment, self-definition is performed by modifying the definition of two pins of the platform trusted root connector 11, setting the signals of the two pins to FLEXIO1 and FLEXIO2 (communication pins), and connecting the signals of the two pins to a complex programmable logic device (CPLD) on the motherboard. The CPLD on the motherboard and the baseboard management controller are interconnected with a TPM_I2C signal (in some embodiments, TPM_I2C_SCL and TPM_I2C_SDA) and a UART signal (in some embodiments, UART_TX and UART_RX). The central processing unit is interconnected with the USB integrated circuit, and the central processing unit outputs a PCIe signal (the PCIe signal is generic, which might be x1, x2, or x4 bandwidth, and the rate might be Gen3, Gen4, or Gen5) to the USB integrated circuit. The USB integrated circuit converts the signal into USB2.0 signals (USB_D+ and USB_D−), and the USB2.0 signal is connected to the motherboard CPLD. The other end of the central processing unit is connected to the platform trusted root connector 11 for transmitting the CPU_TPM_SPI signal. The platform trusted root connector 11 is further connected to the firmware of the basic input/output system to transmit the BIOS_SPI signal. Additionally, the platform trusted root connector 11 is further connected to the firmware of the baseboard management controller to transmit the BMC_SPI signal.

Figure 6:
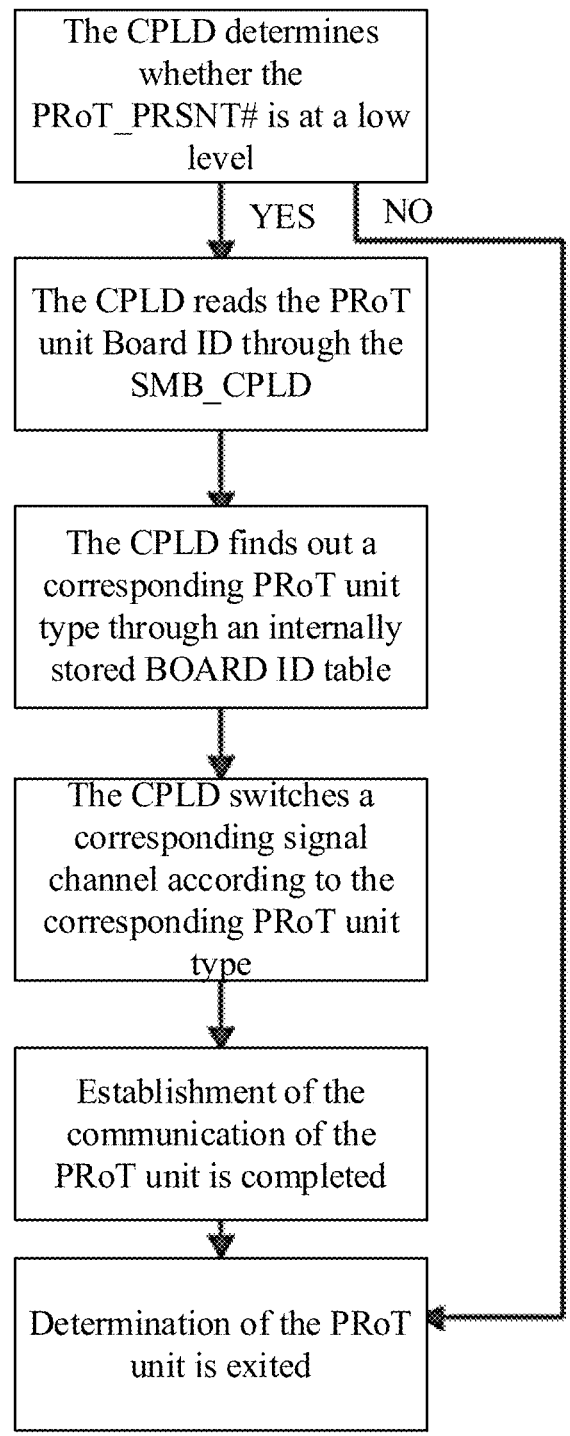
FIG. 6 is a schematic diagram of a specific embodiment of the communication method according to one or more embodiments of the present application.

As shown in FIG. 6, the motherboard CPLD performs logic judgment through a combination of the PROT_PRSNT #signal and the SMB_CPLD signal on the platform trusted root connector 11. The identification logic is as follows: first, the CPLD detects the PROT unit is in position, then identifies a type of the PROT unit by reading the BOARD ID on the PROT unit and referencing the PROT unit comparison table corresponding to the BOARD ID internally stored in the CPLD. After judging the type of the corresponding PROT unit, the CPLD switches one of the UART, TPM I2C, and USB signals to the two pins of the FLEXIO1 and FLEXIO2. With the CPLD, channel switching might be implemented, thereby enabling support for the PROT multi-unit.

Figure 7:
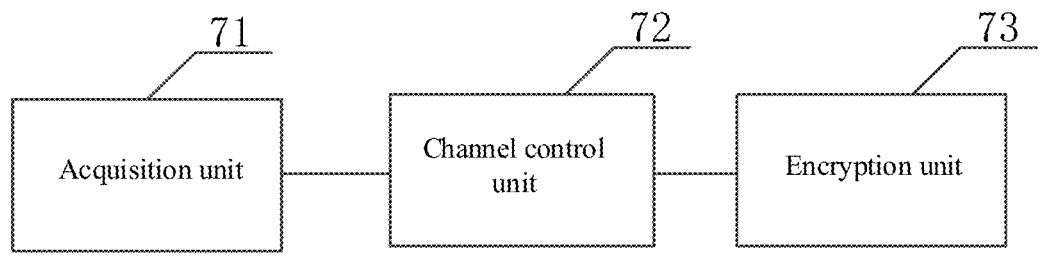
FIG. 7 is a schematic diagram of a communication system according to one or more embodiments of the present application.

To address the aforementioned technical problem, the present application further provides a communication system, as illustrated in FIG. 7, which is applied to the aforementioned communication apparatus and includes:
  an acquisition unit 71 configured for obtaining the preset encryption requirement, and determining the control instruction according to the preset encryption requirement;
  a channel control unit 72 configured for controlling the platform trusted root unit to communicate with one or more functional units to be encrypted according to the control instruction; and an encryption unit 73 configured for triggering the platform trusted root unit to encrypt data of the one or more functional units to be encrypted.

In some embodiments, the acquisition unit 71 includes:
a pin state acquisition unit configured for obtaining a state of a pin, connected with the controller, of the platform trusted root connector; and
a requirement determination unit configured for determining the preset encryption requirement according to the state of the pin.

In some embodiments, the system further includes:
a connection determination unit configured for determining whether the platform trusted root unit is connected to the platform trusted root connector, and to feeding back an output result to the pin state acquisition unit.

In some embodiments, the system further includes:
a first predefinition unit configured for predefining a first pin, connected with the controller, of the platform trusted root connector as an in-position judgment pin;
the connection determination unit is in some embodiments configured for determining whether the platform trusted root unit is connected to the platform trusted root connector according to the level state of the in-position judgment pin, and feeding back the output result to the pin state acquisition unit.

In some embodiments, the platform trusted root unit includes a plurality of types of sub-units and the system further includes:
a second predefinition unit configured for predefining a second pin, connected with the controller, of the platform trusted root connector as a unit type identification pin; and
then, the requirement determination unit is in some embodiments configured for determining the type of the sub-unit connected to the platform trusted root connector according to the level state of the unit type identification pin, and determining the preset encryption requirement according to a determined type of the sub-unit.

In some embodiments, the requirement determination unit is in some embodiments configured for determining an identify label of the sub-unit connected to the platform trusted root connector according to the level state of the unit type identification pin; and determining the type of the sub-unit connected to the platform trusted root connector according to the determined identify label, and determining the preset encryption requirement according to the determined type of the sub-unit.

In some embodiments, the system further includes:
a third predefinition unit configured for pre-establishing a correspondence between the level state of the unit type identification pin and the identify label of each sub-unit; and
the requirement determination unit is in some embodiments configured for determining the identify label of the sub-unit connected to the platform trusted root connector according to the level state of the unit type identification pin and the correspondence, determining the type of the sub-unit connected to the platform trusted root connector according to the determined identify label, and determining the preset encryption requirement according to the determined type of the sub-unit.

In some embodiments, the system further includes:
a fourth predefinition unit configured for predefining a third pin and a fourth pin of the platform trusted root connector as two communication pins; and the channel control unit 72 is in some embodiments configured for determining a target encryption functional unit according to the control instruction, and controlling two data transmission pins corresponding to the target encryption functional unit in the controller to be connected with the two communication pins of the platform trusted root connector in a one-to-one correspondence.

In some embodiments, the channel control unit 72 is in some embodiments configured for controlling a channel between an input end of the controller 12 and a corresponding output end of one or more functional units to be encrypted on conduction in a transparent transmission or conversion manner according to the control instruction, thereby enabling the platform trusted root unit to communicate with the one or more functional units to be encrypted.

In some embodiments, the system further includes:
a log unit configured for triggering a logging operation, wherein the log includes at least a current time and an identifier of a currently conducting channel.

In some embodiments, the system further includes:
a verification unit configured for verifying whether the currently conducting channel might transmit data normally; and if so, proceeding to the step of triggering the platform trusted root unit to encrypt the data of the functional unit to be encrypted; otherwise, outputting exception information.

In some embodiments, the encryption unit 73 is in some embodiments configured for receiving the data to be encrypted generated by one or more functional units to be encrypted; transmitting the data to be encrypted to the platform trusted root connector through a channel conducted by itself, whereby the platform trusted root unit obtains the data to be encrypted; triggering the platform trusted root unit to encrypt the data to be encrypted; obtaining encrypted data transmitted by the platform trusted root unit through the platform trusted root connector; and transmitting the encrypted data to the one or more functional units to be encrypted.

Reference is made to the above-mentioned embodiments for an introduction of the communication system which will not be repeated herein.

Figure 8:
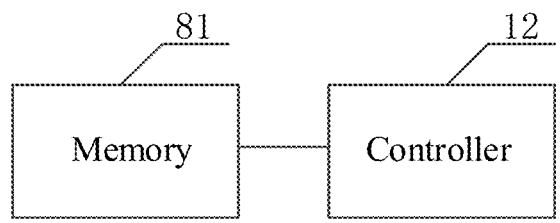
FIG. 8 is a schematic diagram of an electronic device according to one or more embodiments of the present application.

In order to solve the above-mentioned technical problem, the present application provides an electronic device, as shown in FIG. 8, including:
a memory 81 configured for storing a computer program; and
a controller 12 configured for implementing steps of the communication method described above when executing the computer program.

Reference is made to the above-mentioned embodiments for an introduction of the electronic device which will not be repeated herein.

Figure 9:
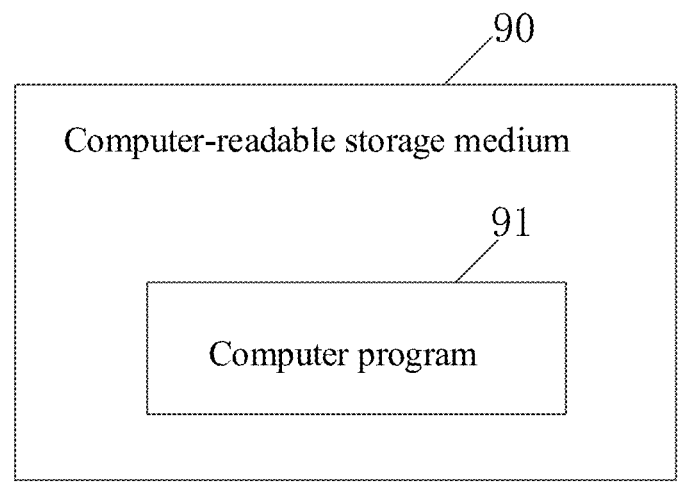
FIG. 9 is a schematic diagram of a non-transitory computer-readable storage medium according to one or more embodiments of the present application.

In order to solve the technical problem described above, the present application further provides a non-transitory computer-readable storage medium 90, as shown in FIG. 9, wherein the non-transitory computer-readable storage medium 90 has stored thereon a computer program 91 which, when executed by a controller 12, implements steps of the communication method described above.

Reference is made to the above-mentioned embodiments for an introduction of the non-transitory computer-readable storage medium which will not be repeated herein.

To address the aforementioned technical problem, the present application further provides an encryption system, including a platform trusted root connector, a platform trusted root unit, a controller, and several functional units to be encrypted, wherein the functional units to be encrypted at least include a baseboard management controller, a central processing unit, and a USB integrated circuit; and the controller controls the platform trusted root unit to encrypt data of one or more functional units to be encrypted through the platform trusted root connector.

Reference is made to the above-mentioned embodiments for an introduction of the encryption system which will not be repeated herein.

To address the aforementioned technical problems, the present application further provides a server, including the encryption system as described above.

Reference is made to the above-mentioned embodiments for an introduction of the server which will not be repeated herein.

It shall be noted that, in the present specification, relational terms such as first and second, and the like, are used herein merely to distinguish one entity or action from another entity or action without necessarily requiring or implying any actual such relationship or order between such entities or actions. Furthermore, the terms "include", "comprise", or any other variation thereof, are intended to cover a non-exclusive inclusion, such that a process, method, article, or device that includes a list of elements not only includes those elements but may include other elements not expressly listed or inherent to such process, method, article, or device. An element defined by the phrase "comprise a" does not, without more constraints, preclude the existence of additional identical elements in the process, method, article, or device that comprises the element.

The foregoing description of the disclosed embodiments is provided to enable a person skilled in the art to make or use the present application. Various modifications to these embodiments will be readily apparent to a person skilled in the art, and the generic principles defined herein may be implemented in other embodiments without departing from the spirit or scope of the application. Thus, the present application is not intended to be limited to the embodiments shown herein but is to comply with the widest scope consistent with the principles and novel features disclosed herein.

What is claimed is:

1. A communication apparatus, comprising:
   a platform trusted root connector disposed on a motherboard of a server and connected to a platform trusted root unit;
   a controller, wherein an input end is connected to the platform trusted root connector, and a plurality of output ends are connected to a plurality of functional units to be encrypted on the server in a one-to-one correspondence; and
   the controller is configured for determining a control instruction according to a preset encryption requirement and controlling the platform trusted root unit to communicate with one or more functional units to be encrypted according to the control instruction;
   wherein the platform trusted root unit comprises a plurality of types of sub-units, and the controller is configured for determining the control instruction according to a type of the sub-units connected to the platform trusted root connector, and controlling the platform trusted root unit to communicate with one or more of the functional units to be encrypted according to the control instruction;
   wherein the platform trusted root unit further comprises an input or output expansion integrated circuit, an input end of the input or output expansion integrated circuit is connected to the platform trusted root connector, a plurality of output ends of the input or output expansion integrated circuit are in a one-to-one correspondence to the plurality of types of sub-units, each of the output ends of the input or output expansion integrated circuit is provided at least of with a pull-up resistor or a pull-down resistor, and when a sub-unit of the sub-units is connected to an output end of the output ends, a level state of the output end connected with the sub-unit is a preset state.

2. The communication apparatus according to claim 1, wherein the sub-units comprise at least one of a platform firmware resilience (PFR) and a basic input output system trusted platform (BIOS TPM) unit, a universal serial bus (USB) unit, a universal asynchronous receiver or transmitter (UART) unit, or a light emitting diode (LED) unit.

3. The communication apparatus according to claim 1, wherein the platform trusted root connector comprises a M-Key connector.

4. The communication apparatus according to claim 1, wherein the functional units to be encrypted at least comprise a baseboard management controller, a central processing unit, and a USB integrated circuit.

5. A communication method, being applied to a communication apparatus, the communication apparatus comprises:
   a platform trusted root connector disposed on a motherboard of a server and connected to a platform trusted root unit;
   a controller, wherein an input end is connected to the platform trusted root connector, and a plurality of output ends are connected to a plurality of functional units to be encrypted on the server in a one-to-one correspondence; and
   the controller is configured for determining a control instruction according to a preset encryption requirement and controlling the platform trusted root unit to communicate with one or more functional units to be encrypted according to the control instruction;
   wherein the platform trusted root unit comprises a plurality of types of sub-units, and the controller is configured for determining the control instruction according to a type of the sub-units connected to the platform trusted root connector, and controlling the platform trusted root unit to communicate with one or more of the functional units to be encrypted according to the control instruction;
   wherein the platform trusted root unit further comprises an input or output expansion integrated circuit, an input end of the input or output expansion integrated circuit is connected to the platform trusted root connector, a plurality of output ends of the input or output expansion integrated circuit are in a one-to-one correspondence to the plurality of types of sub-units, each of the output ends of the input or output expansion integrated circuit is provided at least of with a pull-up resistor or a pull-down resistor, and when a sub-unit of the sub-units is connected to an output end of the output ends, a level state of the output end connected with the sub-unit is a preset state;
   the communication method comprises:
   obtaining the preset encryption requirement, and determining the control instruction according to the preset encryption requirement;
   controlling the platform trusted root unit to communicate with one or more of the functional units to be encrypted according to the control instruction; and triggering the platform trusted root unit to encrypt data of the functional units to be encrypted.

6. The communication method according to claim 5, wherein the obtaining the preset encryption requirement comprises:
obtaining a state of a pin, connected with the controller, of the platform trusted root connector; and
determining the preset encryption requirement according to the state of the pin.

7. The communication method according to claim 6, wherein before obtaining a state of a pin, connected with the controller, of the platform trusted root connector, the communication method further comprises:
determining whether the platform trusted root unit is connected to the platform trusted root connector; and
in response to the platform trusted root unit being connected to the platform trusted root connector, proceeding to the obtaining a state of a pin, connected with the controller, of the platform trusted root connector.

8. The communication method according to claim 7, wherein the communication method further comprises:
predefining a first pin, connected with the controller, of the platform trusted root connector as an in-position judgment pin; and
the determining whether the platform trusted root unit is connected to the platform trusted root connector comprises:
determining whether the platform trusted root unit is connected to the platform trusted root connector according to a level state of the in-position judgment pin.

9. The communication method according to claim 6, wherein the platform trusted root unit comprises a plurality of types of sub-units, and the communication method further comprises:
predefining a second pin, connected with the controller, of the platform trusted root connector as a unit type identification pin; and
the determining the preset encryption requirement according to the state of the pin comprises:
determining a type of a sub-unit of the sub-unit connected to the platform trusted root connector according to a level state of the unit type identification pin.

10. The communication method according to claim 9, wherein the determining a type of a sub-unit of the sub-unit connected to the platform trusted root connector according to a level state of the unit type identification pin comprises:
determining an identify label of the sub-unit connected to the platform trusted root connector according to the level state of the unit type identification pin; and
determining the type of the sub-unit connected to the platform trusted root connector according to a determined identify label.

11. The communication method according to claim 10, wherein the communication method further comprises:
pre-establishing a correspondence between the level state of the unit type identification pin and the identify label of each of the sub-units; and
the determining an identify label of the sub-unit connected to the platform trusted root connector according to the level state of the unit type identification pin comprises:
determining the identify label of the sub-unit connected to the platform trusted root connector according to the level state of the unit type identification pin and the correspondence.

12. The communication method according to claim 5, the communication method further comprises:
predefining a third pin and a fourth pin of the platform trusted root connector as two communication pins; and
the controlling the platform trusted root unit to communicate with one or more of the functional units to be encrypted according to the control instruction comprises:
determining a target functional unit according to the control instruction, and controlling two data transmission pins corresponding to the target functional unit in the controller to be connected with the two communication pins of the platform trusted root connector in a one-to-one correspondence.

13. The communication method according to claim 5, wherein the controlling the platform trusted root unit to communicate with one or more of the functional units to be encrypted according to the control instruction comprises:
the controller controlling a channel between the input end of the controller and the output ends corresponding to one or more of the functional units to be encrypted on conduction in a transparent transmission or conversion manner according to the control instruction, thereby enabling the platform trusted root unit to communicate with one or more of the functional units to be encrypted.

14. The communication method according to claim 13, wherein after the controlling the platform trusted root unit to communicate with one or more of the functional units to be encrypted according to the control instruction, the communication method further comprises:
triggering a logging operation, wherein the log includes at least a current time and an identifier of a currently conducting channel.

15. The communication method according to claim 13, wherein after the controlling the platform trusted root unit to communicate with one or more of the functional units to be encrypted according to the control instruction, the communication method further comprises:
verifying whether a currently conducting channel transmits data normally; and
in response to the currently conducting channel transmitting data normally, proceeding to the triggering the platform trusted root unit to encrypt data of the functional unit to be encrypted; and
in response to the currently conducting channel transmitting data abnormally, outputting exception information.

16. The communication method according to claim 5, wherein the communication method is applied to the controller in the communication apparatus, and the triggering the platform trusted root unit to encrypt data of the functional unit to be encrypted comprises:
receiving data to be encrypted generated by the functional unit to be encrypted;
transmitting the data to be encrypted to the platform trusted root connector through a channel conducted, whereby the platform trusted root unit obtains the data to be encrypted;
triggering the platform trusted root unit to encrypt the data to be encrypted;
obtaining encrypted data transmitted by the platform trusted root unit through the platform trusted root connector; and
transmitting the encrypted data to the functional unit to be encrypted.

17. A non-transitory computer-readable storage medium, wherein the non-transitory computer-readable storage medium has stored there in a computer program which, when executed by a controller, implements the communication method according to claim 5.

18. An electronic device, comprising:
- a memory configured for storing a computer program; and
- a controller configured for implementing the communication method being applied to a communication apparatus, the communication apparatus comprises:
- a platform trusted root connector disposed on a motherboard of a server and connected to a platform trusted root unit;
- a controller, wherein an input end is connected to the platform trusted root connector, and a plurality of output ends are connected to a plurality of functional units to be encrypted on the server in a one-to-one correspondence; and
- the controller is configured for determining a control instruction according to a preset encryption requirement and controlling the platform trusted root unit to communicate with one or more functional units to be encrypted according to the control instruction;
- wherein the platform trusted root unit comprises a plurality of types of sub-units, and the controller is configured for determining the control instruction according to a type of the sub-units connected to the platform trusted root connector, and controlling the platform trusted root unit to communicate with one or more of the functional units to be encrypted according to the control instruction;
- wherein the platform trusted root unit further comprises an input or output expansion integrated circuit, an input end of the input or output expansion integrated circuit is connected to the platform trusted root connector, a plurality of output ends of the input or output expansion integrated circuit are in a one-to-one correspondence to the plurality of types of sub-units, each of the output ends of the input or output expansion integrated circuit is provided at least of with a pull-up resistor or a pull-down resistor, and when a sub-unit of the sub-units is connected to an output end of the output ends, a level state of the output end connected with the sub-unit is a preset state; and wherein
- upon execution of the computer program, the controller configured to:
- obtaining the preset encryption requirement, and determining the control instruction according to the preset encryption requirement;
- controlling the platform trusted root unit to communicate with one or more of the functional units to be encrypted according to the control instruction; and
- triggering the platform trusted root unit to encrypt data of the functional units to be encrypted.

\* \* \* \* \*